United States Patent

Yoshio et al.

[15] 3,666,253
[45] May 30, 1972

[54] FLUIDIZED BED FURNACE

[72] Inventors: Yuri Yoshio, 11-3, Gohonga 2-chome, Meguro-ku, Tokyo; Tanaka Yukio, 16, Shimouma 4-chome, Setagaya-ku, Tokyo, both of Japan

[22] Filed: Dec. 24, 1970

[21] Appl. No.: 101,266

[30] Foreign Application Priority Data

Dec. 26, 1969 Japan..................................44/104328

[52] U.S. Cl. ..........................266/5 E, 117/DIG. 6, 148/14
[51] Int. Cl. ................................................................C21d 1/06
[58] Field of Search.......................266/5 E, 5 R, 3 R; 201/31; 117/DIG. 6, 46 CG

[56] References Cited

UNITED STATES PATENTS

| 2,835,483 | 5/1958 | Lindsay | 266/5 R UX |
| 2,884,373 | 4/1959 | Bailey | 208/132 |
| 3,099,589 | 7/1963 | Tanaka | 148/20.3 |

FOREIGN PATENTS OR APPLICATIONS

| 537,705 | 3/1957 | Canada |
| 1,131,662 | 10/1968 | Great Britain |

*Primary Examiner*—J. Spencer Overholser
*Assistant Examiner*—John E. Roethel
*Attorney*—Hammond & Littell

[57] ABSTRACT

A fluidized bed furnace comprising a furnace body including an upper section and a lower section separated by a gas permeable gas distributor, a fluidized bed contained in said upper furnace body section, electric heating means supported within said upper furnace body section for heating said fluidized bed, a pressure chamber provided in said lower furnace body section for receiving a mixture gas therein under a predetermined pressure, an evaporator means provided in said pressure chamber for receiving liquefied hydrocarbon gas and for evaporating the liquefied gas, and an air supply line extending through one wall of said furnace body in the lower section thereof into said evaporator means whereby said hydrocarbon gas from the evaporator means and air from said air supply line are mixed together and the mixture gas is passed through said gas distributor to heat said fluidized bed in cooperation with the electric heating means and at the same time, said gas distributor is maintained at a low temperature while the fluidized bed is maintained in a nonoxidation atmosphere.

5 Claims, 1 Drawing Figure

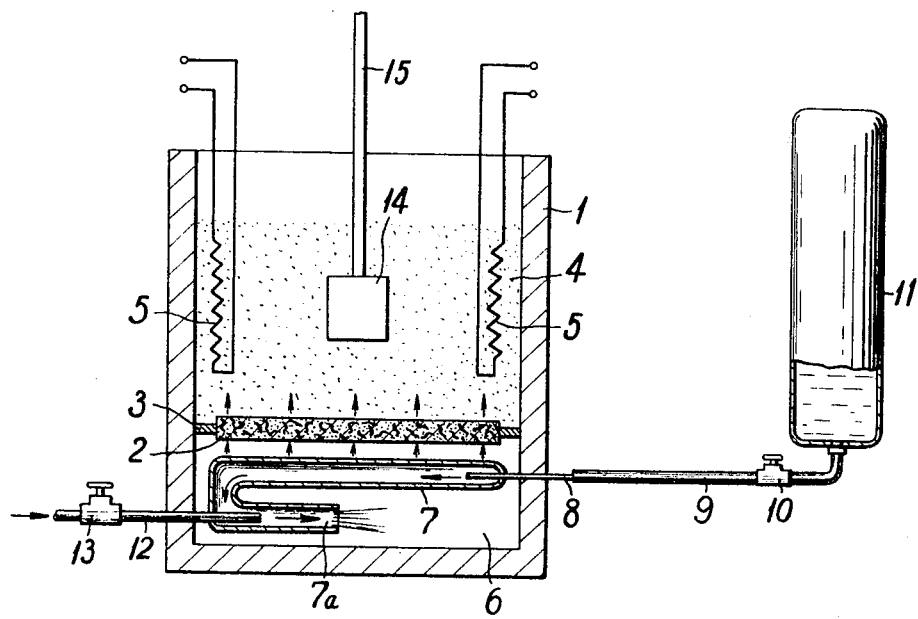

FLUIDIZED BED FURNACE

BACKGROUND OF THE INVENTION

There have been proposed various types of fluidized bed furnaces for heat-treating metals and in one typical conventional fluidized bed furnace, the furnace body is provided with a gas permeable filter plate having a great number of pores therein which is generally called as a gas distributor to divide the interior of the furnace body into an upper section and a lower section and non-electric conductive powder such as alumina ($Al_2O_3$) and electric heating means for heating the powder are received in the upper furnace body above the gas distributor while a pressure chamber is provided in the lower furnace section below the gas distributor for receiving and holding air under a predetermined pressure. With the construction of the conventional furnace, when air is forced upwardly through the pores in the gas distributor into the non-electric conductive powder thereby to form a fluidized bed in the upper furnace section and the thus formed fluidized bed is heated to a predetermined suitable temperature by the electric heating means. Therefore, when a metal workpiece is to be heat-treated in the fluidized bed furnace, the workpiece is immersed into the fluidized bed where the workpiece is heated to a particular desired temperature depending upon whether the workpiece is subjected to hardening, annealing or any other heat treatment.

However, since the conventional fluidized bed furnace referred to above is designed to fluidize non-electric conductive powder by forcing air to impinge against the powder to form a fluidized bed, an oxidation atmosphere is generated in the fluidized bed and the oxidation atmosphere would inevitably oxidize the surfaces of the metal workpiece treated in the furnace. The oxidation of the surfaces of the treated metal workpiece is not desirable from the view point of heat treatment. Therefore, in the fluidized bed furnace referred to above, since the fluidized bed can not be maintained in a reductive atmosphere, such a furnace can not be operated for bright heat treatment and multi-ride heat treatment (or low temperature carburization with nitrization). Furthermore, in the conventional fluidized bed furnace, since the fluidized bed is heated by only electric heating means, it takes a rather long time for heating the metal workpiece to be treated to a required or desired heat treatment temperature consuming a great amount of power which is generally expensive resulting in increase in heat treatment cost.

SUMMARY OF THE INVENTION

This invention relates to a fluidized bed furnace for heat-treating metal workpieces and more particularly, to a fluidized bed furnace for heat-treating metal workpieces which comprises a furnace body, a gas permeable gas distributor which divides the furnace body into an upper section and a lower section, a powder-fluidized bed received in the upper furnace body section above the gas distributor, a pressure chamber provided in the lower furnace body section below the gas distributor for holding gases under a predetermined pressure and electric heating means disposed in the upper furnace section for heating the fluidized bed.

According to the present invention, the pressure chamber is provided with an evaporator means for receiving liquefied hydrocarbon gas and evaporating the combustion gas and an air supply line for supplying air into the evaporator means to form a mixture gas and the mixture gas is then forced upwardly through the gas distributor into the fluidized bed.

One object of the present invention is to provide a fluidized bed furnace for heat-treating metal workpieces in which a mixture gas comprising hydrocarbon gas and air fluidizes a non-electric conductive powder body to form a fluidized bed and the thus formed fluidized bed is heated by electric heating means and heat from the combustion of the hydrocarbon gas of the mixture gas whereby the fluidized bed is maintained in a non-oxidation atmosphere.

Another object of the present invention is to provide a fluidized bed furnace in which liquefied hydrocarbon gas is introduced into and evaporated in a pressure chamber provided below a gas permeable gas distributor and the gas distributor is maintained at a low temperature by the endothermic action caused by the evaporation of the hydrocarbon gas which absorbs the heat of evaporation required for evaporating the hydrocarbon gas whereby the thermal decomposition of the hydrocarbon gas is prevented and accordingly, no free carbons which would otherwise generate to clog up the pores of the gas distributor will be produced.

Another object of the present invention is to provide a fluidized bed furnace in which by selecting a suitable mixing ratio of hydrocarbon gas and air, a fluidized bed can be maintained in a high reductive, a low reductive or a neutral atmosphere and the use of the mixture gas of hydrocarbon gas and air in combination with ammonia gas ($NH_3$) enables the furnace to perform multi-ride heat treatment (or low temperature carburization with nitrization) or bright heat treatment on metal workpieces.

The fluidized bed furnace according to the present invention comprises a conventional furnace body which is divided into an upper body section and a lower body section by a gas permeable gas distributor, but as distinguished from the conventional fluidized bed furnaces, in the furnace of the invention electric heating means are disposed in the upper furnace body section for heating a non-electric conductive powder body received in the upper body section above the gas distributor and a pressure chamber is provided in the furnace body section below the gas distributor. The pressure chamber is in turn provided with an evaporator means for receiving and evaporating liquefied hydrocarbon gas such as liquefied natural gas (LNG) or liquefied propane gas (LPG) and with an air supply line for supplying air necessary for burning the hydrocarbon gas into the evaporator means to form a mixture gas within the pressure chamber. The thus formed mixture gas of vaporized hydrocarbon gas and air is forced upwardly through the gas distributor into the powder body to form a fluidized bed. The thus formed fluidized bed is heated by the electric heating means and the heat from the combustion of the hydrocarbon gas of the mixture gas and at the same time, the fluidized bed is maintained in a non-oxidation atmosphere.

Thus, according to the present invention, the fluidized bed furnaces can be operated for heat-treating various types of metal workpieces in a non-reductive atmosphere and therefore, metal workpieces treated by the furnace will have improved structures over those of comparative metal workpieces treated by the conventional fluidized bed furnaces. And the combination use of power and less expensive liquefied hydrocarbon gas as heating means for the fluidized bed can reduce the necessary amount of expensive power required.

It is to be noted that when liquefied hydrocarbon gas which has been introduced in the pressure chamber is to be evaporated, then the heat from the fluidized bed is transferred through the gas distributor to the hydrocarbon gas and the endothermic action absorbing the heat of evaporation required for heating the hydrocarbon gas maintains the gas distributor at a low temperature (below 200° C). For maintaining the furnace in a stable operation condition, it is an important requirement that the gas distributor be maintained at such a low temperature. If the temperature of the gas distributor exceeds 200° C, the hydrocarbon gas is thermally decomposed as the mixture gas of evaporated hydrocarbon gas and air passes through the gas distributor and free carbons generated from the thermal decomposition of the hydrocarbon deposit in the pores of the gas distributor to clog up the pores resulting in blocking of the succeeding mixture gas flow through the gas distributor. Such a difficulty can be effectively eliminated by maintaining the temperature of the gas distributor below the above-mentioned upper limit for the temperature of the gas distributor.

According to the present invention, there has been provided a fluidized bed furnace comprising a furnace body, a gas permeable gas distributor dividing said furnace body into an upper portion and a lower portion, a fluidized bed defined by said upper furnace body portion, electric heating means immersed in said fluidized bed for heating the bed and a pressure chamber defined by said lower furnace body portion for holding gases under a predetermined pressure, characterized in that said pressure chamber is provided with an evaporator means for receiving and evaporating liquified hydrocarbon gas under pressure and air supply line for forcing air under pressure through said evaporator means into said pressure chamber to form a mixture gas comprising said evaporated hydrocarbon gas and air whereby said mixture gas is forced through said gas distributor into said fluidized bed.

The above and other objects and attendant advantages of the present invention will be more readily apparent to those skilled in the art from a reading of the following detailed description in conjunction with the accompanying drawing which shows one preferred embodiment of the invention for illustration purpose only, but not for limiting the scope of the same in any way.

BRIEF DESCRIPTION OF THE DRAWING

The sole figure of the drawing is a schematic view in vertical section of one preferred form of fluidized bed furnace constructed in accordance with the principle of the present invention.

PREFERRED EMBODIMENT OF THE INVENTION

The present invention will be now described referring to the sole figure of the accompanying drawing in which one preferred embodiment of fluidized bed furnace of the invention is schematically shown. The furnace generally comprises a furnace body 1 in the interior of which a gas permeable gas distributor in the form of a filter plate 2 is horizontally and centrally supported by an annular support member 3 which is in turn fixedly secured at the outer periphery to the inner surfaces of the walls of the furnace body 1 and the gas distributor is formed of a sintered Fe – Ni alloy filter plate having the air permeability on the order of 6 – 7. A non-electric conductive powdery mass such as alumina having the grain size of about 100 mesh which forms a fluidized bed 4 is contained in the furnace body 1 above the gas distributor 2 and electric heating means 5 extend downwardly into the fluidized bed 4 along and supported by each of the furnace walls for heating the bed. The other or outer end of the heating means 5 is connected to a suitable conventional electric power source (not shown). Defined within the furnace body 1 below the gas distributor 2 is a pressure chamber 6 which is adapted to hold gases therein under a predetermined pressure and force the gases upwardly through the gas distributor 2 under the predetermined pressure. The pressure chamber 6 houses an evaporator tube 7 which is adapted to receive liquefied hydrocarbon gas such as liquified natural gas (LNG) or liquified propane gas (LPG) under pressure from a supply source as will be described hereinbelow and to evaporate the gas with the aid of the heat from the heated fluidized bed 4. The evaporator tube 7 is bent into a substantially U-shape to form an upper longer section which communicates at one end with the gas supply source (not shown) and a lower shorter section which communicates at one end with the other end of the upper tube section and is open at the other end to provide a jet nozzle 7a. A capillary tube 8 having a small diameter extends through one of the furnace body walls into the adjacent end of the upper longer section of the evaporator tube 7 and the other end of the capillary tube is connected through a supply line 9 having a valve 10 to a pressurized liquified hydrocarbon gas supply source such as a liquefied propane gas bomb 11. In order to supply air required to support the combustion of the evaporated hydrocarbon gas which has been spouted though the nozzle 7a into the pressure chamber 6, an air supply line 12 having a valve 13 extends through one of the furnace walls which is opposite to the wall through which the capillary tube 8 extends into the end of the lower shorter section of the evaporator tube 7 where the lower tube section communicates with the upper longer section of the same evaporator tube.

With the above arrangement and construction of the component parts of the fluidized bed furnace of the invention, in operation, liquified hydrocarbon gas flows from the supply bomb 11 through the supply line 9 and capillary tube 8 into the evaporator tube 7 whereupon the liquified gas is evaporated into vapor and the vaporized gaseous body flows down through the evaporator tube 7 to the jet nozzle 7a from which the vapor is spouted into the pressure chamber 6. At the same time, air under pressure is supplied from the air supply source (not shown) through the air supply line 12 into the evaporator tube 7 at the end of the lower shorter section opposite to the nozzle 7a. The evaporated gas and air under pressure together are then spouted through the jet nozzle 7a of the evaporator tube 7 into the pressure chamber 6 as a mixture jet effluent. The pressure of the mixture gas comprising the evaporated hydrocarbon gas and air within the pressure chamber 6 is set at a value somewhat higher than that which corresponds to a particular head loss of pressure which will occur when the mixture gas passes through the pores in the gas distributor 2, e.g., about 0.25 kg/cm². By setting the pressure of the mixture gas within the pressure chamber at such a value, the mixture gas within the pressure chamber 6 is permitted to spout upwardly through the pores in the gas distributor 2 into the powdery mass above the gas distributor 2 in the furnace body 1 to form the fluidized bed 4. Since the furnace section above the gas distributor 2 has been heated and maintained at an elevated temperature by the electric heating means 5 which have been energized up to now, the fluidized bed 4 is heated to an elevated temperature and the heating of the fluidized bed is assisted by the combustion of the hydrocarbon gas of the mixture gas. The fluidized bed 4 is also maintained in its fluidizing state by the upwardly moving mixture gas passing through the gas distributor 2. In this way, the fluidized bed 4 is uniformly heated to a desired operation temperature such as 1,100° C, for example and the interior of the fluidized bed is maintained in a non-oxidation atmosphere.

In such a case, since the gas distributor 2 is cooled by an endothermic action caused by the evaporation of the hydrocarbon gas the mixture gas, even when the fluidized bed 4 is heated to such a high temperature the gas distributor 2 can be maintained at a relatively low temperature. Experiments have shown that when the fluidized bed 4 is maintained at 760° C, the gas distributor 2 can be maintained at about 70° C. Thus, the hydrocarbon gas of the mixture gas will be free of thermal decomposition when the mixture gas passes up through the pores in the gas distributor 2 and accordingly, no free carbons will be generated from the hydrocarbon gas to assure a stable mixture gas flow through the gas distributor 2 without any difficulty because the hydrocarbon gas is not thermally decomposed.

Thus, in operation, when a metal work to be heat-treated 14 is suspended by a suitable hanging means 15 above the furnace body 1 and allowed to immerse into the fluidized bed 4 maintained at an elevated temperature, the metal work can be heat-treated in a non-oxidation atmosphere.

In the fluidized bed furnace of the invention as mentioned above, when hydrocarbon gas and air are mixed in the ratio range of 1 to 6 – 15 by volume, the fluidized bed can be maintained in a non-oxidation atmosphere. Particularly, when the mixing ratio of hydrocarbon gas to air is selected as 1 to 6, the fluidized bed can be maintained in a reductive atmosphere suitable for bright heat treatment or in a carburization atmosphere suitable for surface hardening treatment of metal workpieces. And when the mixing ratio of hydrocarbon gas to air is selected as 1 to 10 – 15, the fluidized bed can be maintained in a low reductive atmosphere or a neutral atmosphere.

Furthermore, in the fluidized bed furnace of the invention as mentioned above, when a further separate line is provided for introducing ammonia gas ($NH_3$) into the pressure chamber 6 and the mixture gas of hydrocarbon gas and air is employed in conjunction with NH₃ gas, the fluidized bed can be maintained in an atmosphere suitable for multiride heat treatment (or low temperature carburization with nitrization).

The following are examples in which the operation on the fluidized bed furnace of the invention was successfully carried out. The dimensions of the components of the furnace and operative conditions employed in the examples were:

1. Furnace body:
   600 mm × 600 mm × 750 mm (inside dimensions)
2. Fluidized bed:
   Alumina powder of 80 – 100 mesh
   Depth ... 500 mm
   Apparent specific gravity ... 1.8
   temperature ... 1,050° C
3. Gas distributor:
   A sintered filter plate formed of granular Fe – Ni alloy and having the thickness of 3 mm with the gas permeability of 6 – 7
4. Pressure chamber:
   600 mm × 600 mm × 60 mm (inside dimensions)
   One ammonia gas supply line, one air supply line and one LPG evaporator tube were provided in the pressure chamber.
5. Electric heating means:
   One 1.5 KW ribbon heater was supported on each of all the four walls of the furnace body and the heaters were immersed into the fluidized bed.
   Total power ... 1.5 KW × 4 = 60 KW.
   Temperature of heaters ... 1,200° C

EXAMPLE 1

A 20 kg of steel die was immersed into the non-oxidation fluidized bed. The workpiece was heated at 1,050° C for 20 minutes and then taken out of the bed to be allowed to cool in the open air whereby the workpiece was hardened. The thus treated steel die had no oxidized area on the surfaces thereof. The amounts of LPG and air consumed in the operation were:

Consumption amount of LPG ... 2 kg/hr.
Consumption amount of Air ... 180 l/min.
No NH₃ gas was used.

EXAMPLE 2

The same type steel die as that employed in Example 1 was subjected to multi-ride heat treatment (or low temperature carburization with nitrization) in a reductive atmosphere containing NH₃ gas under the following conditions:

Consumption amount of LPG ... 2 kg/hr.
Consumption amount of air ... 80 l/min.
Consumption amount NH₃ gas ... 40 l/min.
Treatment time ... 4 hr.
Treatment temperature ... 580° C
Thickness of treated layer of the die steel ... 80 $\mu$

EXAMPLE 3

A 20 kg of plain carbon steel was subjected to carburization treatment in a reductive atmosphere containing NH₃ gas under the following conditions:

Consumption amount of LPG ... 2.8 kg/hr.
Consumption amount of air ... 20 l/min.
Consumption amount of NH₃ gas ... 2 l/hr.
Treatment time ... 4 hrs.
Treatment temperature ... 850° C
Thickness of treated layer on the plain carbon steel ... 100 $\mu$ While there has been described what is at present considered to be the preferred embodiment of this invention, it will be obvious to those skilled in the art that various changes and modifications may be made therein without departing from the scope and spirit of the invention, and it is aimed, therefore, in the appended claims to cover all such changes and modifications as fall within the true spirit and scope of the invention.

What is claimed is:

1. A fluidized bed furnace comprising a furnace body, a gas permeable gas distributor dividing said furnace body into an upper portion and a lower portion, a fluidized bed defined by said upper furnace body portion, electric heating means immersed in said fluidized bed for heating the bed and a pressure chamber defined by said lower furnace body portion for holding gases under a predetermined pressure, characterized in that said pressure chamber is provided with an evaporator means for receiving and evaporating liquefied hydrocarbon gas under pressure and an air supply line for forcing air under pressure through said evaporator means into said pressure chamber to form a mixture gas comprising said evaporated hydrocarbon gas and air whereby said mixture gas is forced through said gas distributor into said fluidized bed.

2. A fluidized bed furnace as set forth in claim 1, in which said fluidized bed comprises a non-electric conductive powdery body such as alumina powder and is maintained in a fluidizing state by said mixture gas of evaporated hydrocarbon gas and air as the mixture gas is being forced through said gas distributor into the powdery body.

3. A fluidized bed furnace as set forth in claim 1, in which said fluidized bed is heated by said electric heating means and the heat from the combustion of said hydrocarbon gas of the mixture gas and at the same time, is maintained in a non-oxidation atmosphere.

4. A fluidized bed furnace as set forth in claim 1, in which the mixing ratio of said hydrocarbon gas to air is selected within the range 1 to 6 – 10 by volume.

5. A fluidized bed furnace as set forth in claim 1, in which said evaporator means comprising a substantially U-shaped tube having an upper longer section and a lower shorter section provided at one end with a jet nozzle and said air supply line extends at one end through one of the walls of said furnace body into said lower evaporator tube section at the end thereof opposite to said jet nozzle and at the other end extends to a pressurized air supply source, and further including an capillary tube which communicates at one end with said upper evaporator tube section and at the other end through a gas supply line to a gas supply bomb.

* * * * *